United States Patent
Harada et al.

(10) Patent No.: US 11,828,182 B2
(45) Date of Patent: Nov. 28, 2023

(54) METHOD FOR PRODUCING INTEGRALLY BLADED ROTOR, PROGRAM FOR CUTTING BLADE OF INTEGRALLY BLADED ROTOR, AND INTEGRALLY BLADED ROTOR

(71) Applicant: Yamazaki Mazak Corporation, Niwa-gun (JP)

(72) Inventors: Yukihide Harada, Niwa-gun (JP); Tetsuji Fujita, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 17/679,106

(22) Filed: Feb. 24, 2022

(65) Prior Publication Data
US 2022/0178257 A1 Jun. 9, 2022

Related U.S. Application Data (63) Continuation of application No. PCT/JP2019/034196, filed on Aug. 30, 2019.

(51) Int. Cl.
*G05B 19/4099* (2006.01)
*F01D 5/02* (2006.01)

(52) U.S. Cl.
CPC .......... *F01D 5/02* (2013.01); *G05B 19/4099* (2013.01); *B23B 2215/81* (2013.01);
(Continued)

(58) Field of Classification Search
CPC ............ F05D 2230/10; F05D 2230/20; B23B 2215/81; G05B 19/4099; G05B 2219/45147; F01D 5/34
See application file for complete search history.

(56) References Cited

U.S. PATENT DOCUMENTS 6,912,446 B2 * 6/2005 Wang ................. B23P 6/007
700/118
8,615,317 B2 * 12/2013 Neumaier ........ G05B 19/40937
451/28
(Continued)

FOREIGN PATENT DOCUMENTS

| CN | 101980819 | 2/2011 |
| CN | 102436216 | 5/2012 |

(Continued)

OTHER PUBLICATIONS

International Search Report for corresponding International Application No. PCT/JP2019/034196, dated Nov. 19, 2019.
(Continued)

*Primary Examiner* — Courtney D Heinle
*Assistant Examiner* — Danielle M. Christensen
(74) *Attorney, Agent, or Firm* — MORI & WARD, LLP (57) ABSTRACT

A method for producing an integrally bladed rotor includes providing imaginary front and rear lattice points on the ridges of the front and rear edges; providing a first imaginary line on positive-pressure and negative-pressure surfaces to connect a first imaginary front lattice point and a first imaginary rear lattice point; providing a second imaginary line on the positive-pressure and negative-pressure surfaces to connect a second imaginary front lattice point next to the first imaginary front lattice point and a second imaginary rear lattice point next to the first imaginary rear lattice point; providing a spiral path on the positive-pressure and negative-pressure surfaces by connecting the first and second imaginary lines with a spiral curve; and cutting the positive-pressure and negative-pressure surfaces by moving a cutting point corresponding to a cutting edge of a turning tool along the spiral path. point around the blade.

18 Claims, 6 Drawing Sheets

(52) U.S. Cl.
CPC ...... *F05D 2230/20* (2013.01); *F05D 2240/20* (2013.01); *G05B 2219/45147* (2013.01)

(56) References Cited

U.S. PATENT DOCUMENTS

| | | | |
|---|---|---|---|
| 2002/0091457 | A1 | 7/2002 | Kadono |
| 2003/0039547 | A1 | 2/2003 | Bourgy et al. |
| 2008/0206000 | A1 | 8/2008 | Sasu et al. |
| 2009/0304473 | A1 | 12/2009 | Holze et al. |
| 2010/0023157 | A1* | 1/2010 | Burgess ............. G05B 19/4093 700/186 |
| 2010/0074704 | A1 | 3/2010 | Rozic et al. |
| 2010/0175256 | A1 | 7/2010 | Zhu et al. |
| 2011/0016716 | A1 | 1/2011 | Berlanger et al. |
| 2012/0124834 | A1* | 5/2012 | Cholet .................... B24B 21/16 29/889.7 |
| 2018/0250733 | A1 | 9/2018 | Ochiai et al. |

FOREIGN PATENT DOCUMENTS

| | | |
|---|---|---|
| CN | 111373866 B | 10/2012 |
| CN | 103616850 | 3/2014 |
| CN | 108229019 | 6/2018 |
| DE | 102011102286 | 11/2012 |
| JP | 2003-120203 | 4/2003 |
| JP | 2009-262320 | 11/2009 |
| JP | 2010-180877 | 8/2010 |
| JP | 2017-131898 | 8/2017 |
| JP | WO2018/003089 | 1/2018 |

OTHER PUBLICATIONS

Written Opinion for corresponding International Application No. PCT/JP2019/034196, dated Nov. 19, 2019.
Japanese Office Action for corresponding JP Application No. 2020-508634, dated Mar. 24, 2020 (w/ English machine translation).
European Search Report for corresponding EP Application No. 19943244.4-1205, dated Jun. 15, 2022.
European Office Action for corresponding EP Application No. 19943244.4-1205, dated Jun. 29, 2022.
European Office Action for corresponding EP Application No. 19943244.4-1205, dated Mar. 20, 2023.
Translation of the Written Opinion for corresponding International Application No. PCT/JP2019/034196, dated Nov. 19, 2019.
Chinese Office Action for corresponding CN Application No. 201980099351.3, dated Aug. 1, 2023.

* cited by examiner

METHOD FOR PRODUCING INTEGRALLY BLADED ROTOR, PROGRAM FOR CUTTING BLADE OF INTEGRALLY BLADED ROTOR, AND INTEGRALLY BLADED ROTOR

CROSS-REFERENCE TO RELATED APPLICATIONS

The present application is a continuation application of International Application No. PCT/JP2019/034196, filed Aug. 30, 2019. The contents of this application are incorporated herein by reference in their entirety.

BACKGROUND OF THE INVENTION

Field of the Invention

The present invention relates to: a method for producing an integrally bladed rotor; a program for cutting blade of an integrally bladed rotor; and an integrally bladed rotor.

Discussion of the Background

Integrally bladed rotors (IBR: Integrally Bladed Rotors), which are commonly referred to as BLISKs (BLISK: bladed-in disks) and in which a rotor disc and a blade are integrated to each other, have been proposed for use as fans and/or compressor rotors in gas turbine engines for aerial vehicle uses. This is because of the expectation that using an integrally bladed rotor leads to a great weight reduction of the engine, resulting in improved fuel efficiency. A known method for producing an integrally bladed rotor includes: producing a blade at a separate step and integrating the blade to a disc by a connection method similar to friction pressure welding. Another known production method is to cut a disc blank into an outer shape of a blade.

For example, JP 2009-262320A discloses a method associated with machining of a blade of an integrally bladed rotor having a complicated three-dimensional shape. In the method, point-contact milling is performed using a cutter having a hemispherical machining head. A complex shaped blade has a plate shape that is twisted about a radial direction axis and that is tapered from a base end portion toward a leading end portion of the blade. This blade is first subjected to rough milling, and then subjected to finish cutting by milling the depressed positive-pressure surface, the protruding negative-pressure surface, and a ring-shaped portion of the blade. In this respect, the both surfaces are subjected to milling in such a manner that the cutting edge of the cutter forms cutting strips that have equal widths and that are oriented in an air-flow direction in which air flows between the blades. Such blades are described as being low in aerodynamic loss.

When a blade is machined by milling into a complicated three-dimensional shape, chatter (vibration) and/or deformation are more likely to occur and become a serious problem at high-speed machining. In light of this, another method taken into consideration is to perform cutting using a turning chip. A machining control method referred to as "orbit boring" is known as a method of curved-surface machining performed by the above-described cutting. In this method, a tool spindle is caused to make a circular interpolation motion while the rotation of the tool spindle is controlled so that a turning tool is oriented in an arc radius direction.

For example, JP WO2018/003089 A1 describes such a method that includes performing speed clamp processing with respect to a control axis in orbit boring. Performing speed clamp processing is described as enabling a high speed motion of the control axis while preventing cutting load from fluctuating. Generally, if the speed of a radial movement is restricted, making an axial movement takes time, even though an orbiting motion can be continued. This elongates the time for the turning tool to make approaching and withdrawal motions. Also, at a high orbiting speed, the axes may exceed respective tolerance speeds, even if the radial direction speed is restricted. This may make it impossible to synchronize the axes, with the result that the machining can not be continued. In light of this fact, a measure proposed is to make speed clamp processing depend on a movement mode. Speed clamp processing is processing of controlling the control axes so that the feed rates of the control axes do not exceed respective tolerance feed rates.

In recent years, there has been a demand for a higher level of engine fuel efficiency toward engines such as gas turbine engines for use in aerial vehicles. In light of this demand and other considerations, there have been proposed integrally bladed rotors designed at an advanced level. This has caused a demand for a significantly high level of machining accuracy, especially for a high level of accuracy in machining thin blades.

SUMMARY OF THE INVENTION

According to one aspect of the present invention, a method for producing an integrally bladed rotor includes providing a pre-machined bladed rotor that includes a rotor disc and blades which are integrally provided around the rotor disc and each of which has a positive-pressure surface and a negative-pressure surface opposite to the positive-pressure surface to have a ridge of a front edge and a ridge of a rear edge at which the positive-pressure surface and the negative-pressure surface merge; providing imaginary front lattice points on the ridge of the front edge and imaginary rear lattice points on the ridge of the rear edge; providing a first imaginary line on the positive-pressure surface and the negative-pressure surface to connect a first imaginary front lattice point among the imaginary front lattice points and a first imaginary rear lattice point among the imaginary rear lattice points; providing a second imaginary line on the positive-pressure surface and the negative-pressure surface to connect a second imaginary front lattice point next to the first imaginary front lattice point among the imaginary front lattice points and a second imaginary rear lattice point next to the first imaginary rear lattice point among the imaginary rear lattice points; providing a spiral path on the positive-pressure surface and the negative-pressure surface by connecting the first imaginary line and the second imaginary line with a spiral curve; and cutting the positive-pressure surface and the negative-pressure surface of each of the blades by moving a cutting point corresponding to a cutting edge of a turning tool on the positive-pressure surface and the negative-pressure surface along the spiral path.

According to another aspect of the present invention, a program is for cutting a blade of an integrally bladed rotor. The integrally bladed rotor includes a rotor disc and a three-dimensional and planar blade that is integral to the rotor disc and that has a positive-pressure surface and a negative-pressure surface as main surfaces. The program includes a step of: dividing a ridge of a front edge of the blade and a ridge of a rear edge of the blade into a predetermined number of ridge pieces; setting imaginary lattice points on the respective ridge pieces; and setting a closed curve around the blade such that the closed curve passes through: a front-edge imaginary lattice point that is among the imaginary lattice points set on the front edge and that has an arrangement order as counted from the rotor disc; a rear-edge imaginary lattice point that is among the imaginary lattice points set on the rear edge and that has the same arrangement order as counted from the rotor disc; the positive-pressure surface; and the negative-pressure surface. The program also includes: a machining command data preparation step of preparing a machining command for forming the closed curve continuously in a spiral shape and causing a cutting edge of a turning tool to interpolate the closed curve by moving along the spiral shape; and based on the machining command, cutting the blade by circumferentially moving a cutting point around the blade along the closed curve, the cutting point corresponding to a position of the cutting edge.

According to the other aspect of the present invention, an integrally bladed rotor includes: a rotor disc; and a three-dimensional and planar blade integral to the rotor disc and having a positive-pressure surface and a negative-pressure surface as main surfaces. A radial-direction ridge of a front edge of the blade and an axial-direction ridge of a rear edge of the blade are divided into a predetermined number of ridge pieces, and imaginary lattice points are set on the respective ridge pieces. The blade is cut such that the blade is positioned in a closed curve passing: a front-edge imaginary lattice point that is among the imaginary lattice points set on the front edge and that has an arrangement order as counted from the rotor disc; a rear-edge imaginary lattice point that is among the imaginary lattice points set on the rear edge and that has the same arrangement order as counted from the rotor disc; the positive-pressure surface; and the negative-pressure surface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to FIGS. 1 to 7, a method according to an embodiment the present invention for producing an integrally bladed rotor will be described in detail.

Figure 1:
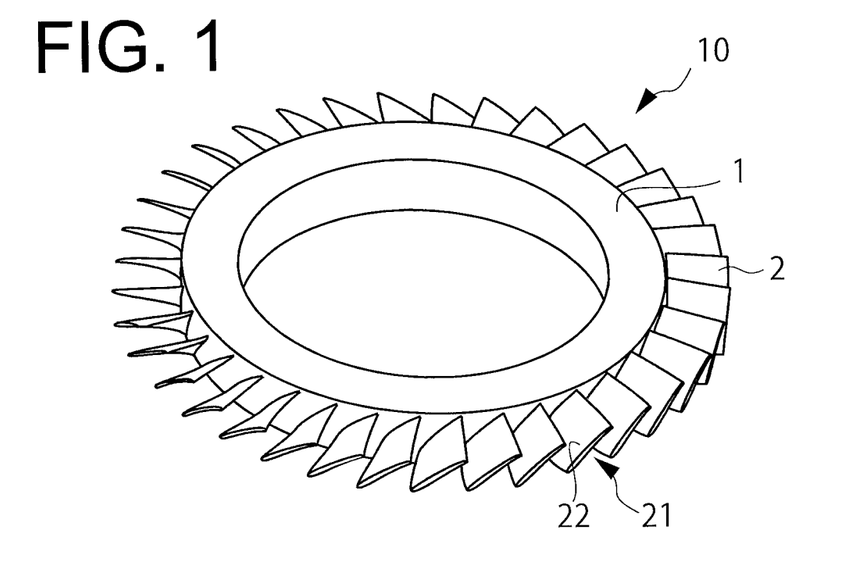
FIG. 1 is a perspective view of an integrally bladed rotor obtained by one embodiment of a production method according to an embodiment the present invention.

As illustrated in FIG. 1, an integrally bladed rotor 10 includes: a rotor disc 1, which is a ring-shaped plate; and a plurality of the blades 2, which are integral to the outer circumference of the integrally bladed rotor 10. Each of the blades 2 is a three-dimensional plate having a positive-pressure surface 21 and a negative-pressure surface 22 as main surfaces.

Figure 2:
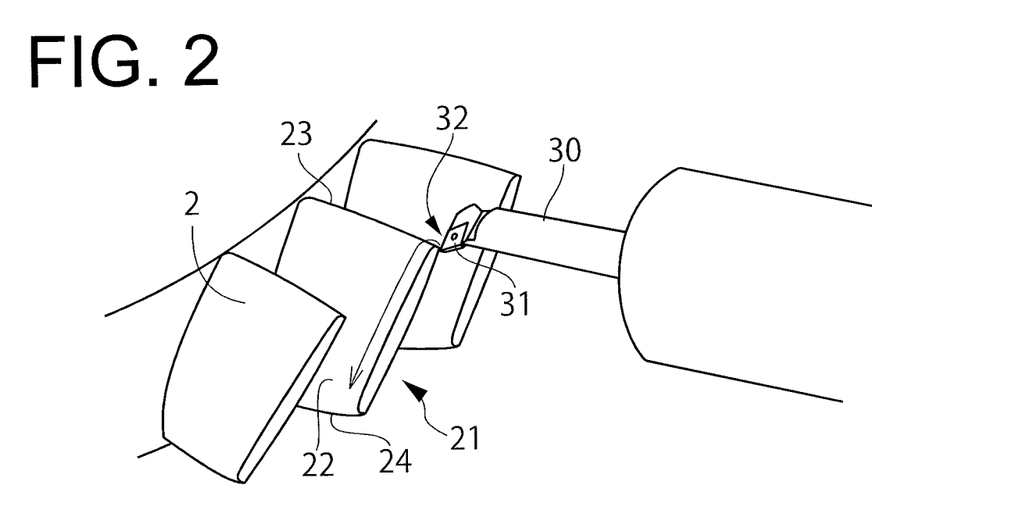
FIG. 2 is a perspective view of a pre-cut blade of the integrally bladed rotor.

As illustrated in FIG. 2, a pre-machined bladed rotor has the blades 2 which are produced integrally with the rotor disc 1 and which are roughly machined in advance into a wing shape. Generally, the finishing of each blade 2 includes machining using a rotating tool such as an end mill. In this embodiment, however, the blade is cut by moving the cutting edge of a turning tool along the surfaces of the blade. Specifically, as indicated by the arrow illustrated in the figure of interest, the blade is cut by circumferentially moving a cutting edge 32 of a turning tool 30 around the blade 2 such that the cutting edge 32 starts from a point on the front edge 23 of the blade 2; moves on the negative-pressure surface 22, a rear edge 24, and the positive-pressure surface 21 (or point on the front edge 23 of the blade 2 moves on the positive-pressure surface 21, the rear edge 24, and the negative-pressure surface 22) in this order; and returns to the front edge 23. More specifically, an imaginary closed curve C, which circumferentially moves around the blade 2 (see FIG. 5A), is prepared and a path R is defined by the closed curve C. The blade 2 is cut by moving the turning tool 30 relative to the blade 2 along the path R.

Figure 3:
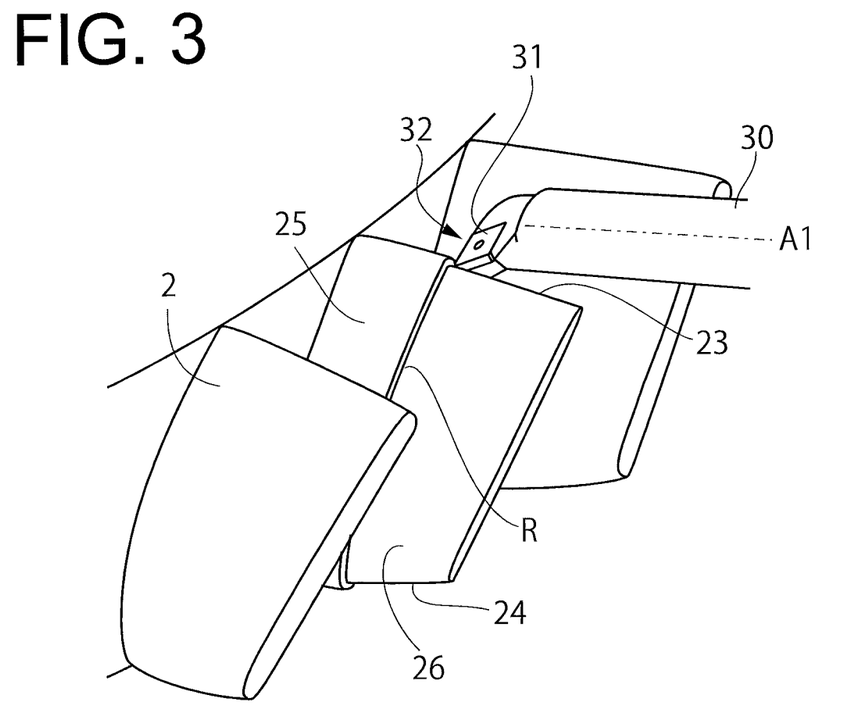
FIG. 3 is a perspective view of the blade that is being cut.

As illustrated in FIG. 3, this cutting is performed by making a feed movement from a leading end portion toward a base end portion of the blade 2. Specifically, a plurality of closed curves C, each of which is an imaginary curve (see FIG. 5A), are arranged in advance from the leading end portion toward the base end portion of the blade 2. Then, the blade 2 is cut by making a feed movement along each of the closed curves C. This cutting is repeated by a number equal to the number of the closed curves C. That is, the cutting edge 32 is fed such that the cutting edge 32 moves from a start point on the closed curve C and makes a circumferential movement along the closed curve C, and that upon completion of one circumferential movement, the cutting edge 32 moves to a start point on the next closed curve. Thus, the cutting edge 32 moves spirally along a spiral path SP (see FIG. 5B) such that the cutting edge 32 moves to the adjoining closed curve every time the cutting edge 32 makes one circumferential movement. The path R is defined as a curve defined by this spiral movement. That is, the path R is a curve interpolated by making the closed curve C continue in a spiral shape. This ensures that the entirety of the positive-pressure surface 21, the negative-pressure surface 22, the front edge 23, and the rear edge 24 of the blade 2 is cut.

Figure 4:
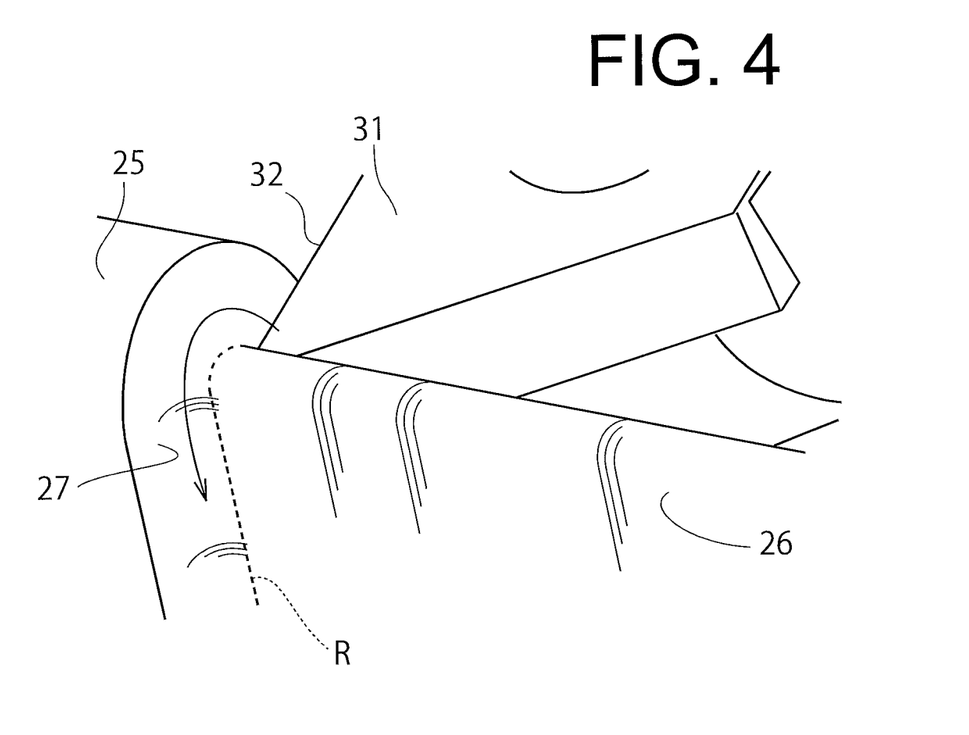
FIG. 4 is an enlarged view of main elements illustrated in FIG. 3.

This configuration will be further described by referring to FIG. 4. After the blade 2 is cut by feeding the cutting edge 32 to make a circumferential movement along the closed curve C, a cutting point at a leading end portion of a chip 31 has moved along a curve defined by a corner portion between a post-cutting surface 26 and a step 27, which is located between a pre-cutting surface 25 and the post-cutting surface 26. This curve is defined as the path R. In this respect, the direction of extension of the cutting edge 32 of the chip 31, which is mounted on a leading end portion of the turning tool 30, is preferably parallel to a surface normal of the cutting point of the blade 2. That is, the cutting point is moved on a curved surface smooth enough to ensure that a surface normal can be established at any portion of the curved surface. This configuration is preferable in that the occurrence of chatter is eliminated or minimized. In this case, the path R is a continuous curve smooth enough to ensure that a tangent can be established on every cutting point moving on the path R. Therefore, the path R is differentiable. The path R is obtained by applying a feed movement to a trajectory circumferentially drawn around the blade 2 along the closed curve C, and is made differentiable by interpolating the closed curve C as a differentiable curve. In this respect, the front edge 23 and the rear edge 24 are formed as curved surfaces continuous from the positive-pressure surface 21 and the negative-pressure surface 22. As described above, the path R should be along the post-cutting surface; more specifically, the path R is determined by interpolating the closed curve C after the closed curve C has been prepared on a post-machining ideal shape (model). It is to be noted that the direction in which the cutting edge 32 extends may be inclined relative to the surface normal of the cutting point, so that a lead angle is formed.

Figure 5A:
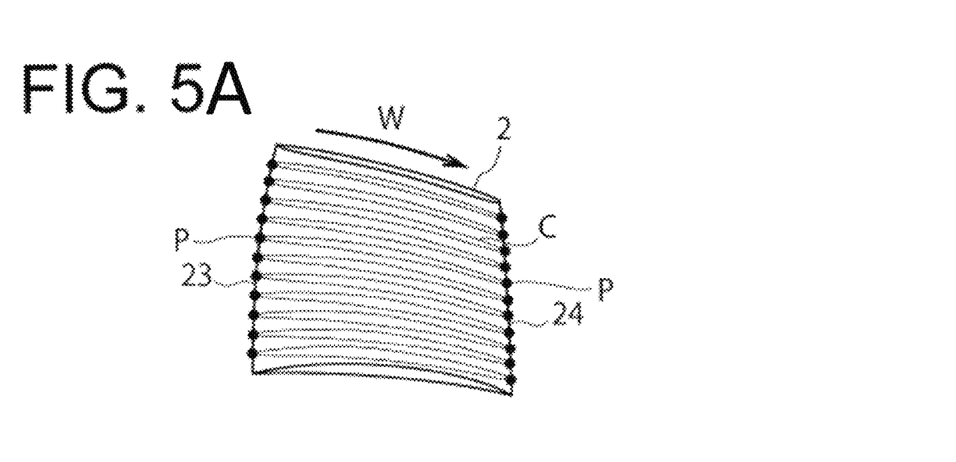
FIG. 5A is a perspective (see-through) view of a closed curve set around a blade.
Figure 5B:
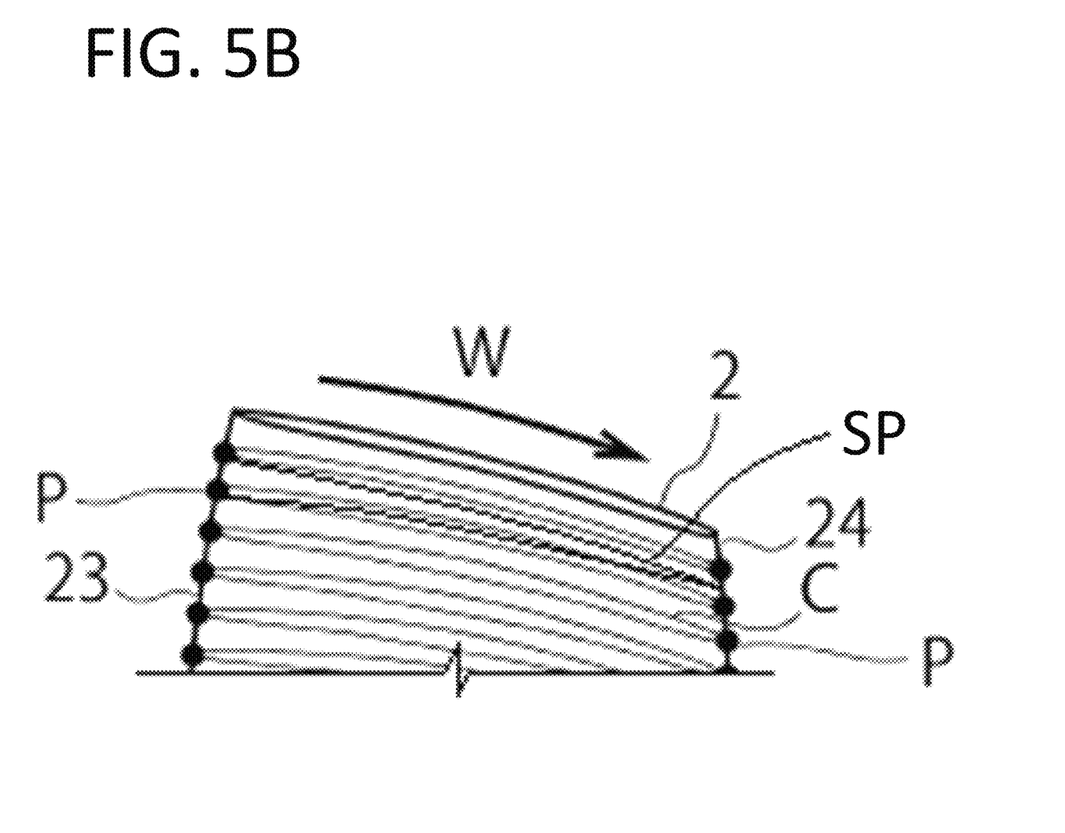
FIG. 5B is an enlarged partial view of FIG. 5A.

As illustrated in FIG. 5A, the closed curve C is made to pass through imaginary lattice points P, which are set on the ridges of the front edge 23 and the rear edge 24. The lattice points P on the ridge of the front edge 23 and the lattice points P on the ridge of the rear edge 24 are the same in number and are set by dividing each ridge into a predetermined number of ridge pieces. A closed curve C is set such that the closed curve C passes through: a front-edge lattice point P that is among the lattice points P set on the front edge 23 and that has an arrangement order as counted from the rotor disc 1; and a rear-edge lattice point P that is among the lattice points P set on the rear edge 24 and that has the same arrangement order as counted from the rotor disc 1. As used herein, the term "arrangement order" is intended to mean that if a lattice point P has an N-th arrangement order (N is an integer), this lattice point P is an N-th lattice point P as counted from the rotor disc 1. Further, the path R may be determined by interpolating the curve C such that, for example, the curve C passes through one of the two lattice points P that is set on one of the ridges. First, a vector from a first lattice point to the next lattice point is obtained. Then, points are set on the closed curve C; the distance on the closed curve C between the lattice point and each of the points is obtained; and a ratio of the distance to the length of the closed curve C is obtained. Then, at each point, the above-described vector is multiplied by the ratio obtained at the each point, resulting in another vector. The another vector is added to the above-described vector, thereby obtaining a new point. An interpolation is performed at this new point, thereby obtaining the path R. It is to be noted that each of the lattice points P may be selected from, for example, division points obtained by dividing the ridge at equal intervals. Selecting a lattice point P from equal-interval division points makes the setting of the lattice point P less laborious. Also, setting the lattice points P at equal intervals uniformizes the amount of cutting per circumferential movement. This stabilizes the cutting as a whole, contributing to highly accurate machining. Also, the closed curve C is preferably set along the flow of air (see arrow W) occurring on the blade 2 in an application in which the integrally bladed rotor 10 is incorporated in a turbine and turned into motion. It is to be noted that while a single arrow W is illustrated in the figure, the closed curve C is set based on varying flows of air on different parts of the blade 2. This ensures that a resulting cutting trace is formed along the direction in which air flows, making the blade 2 superior in aerodynamic characteristics.

Figure 6:
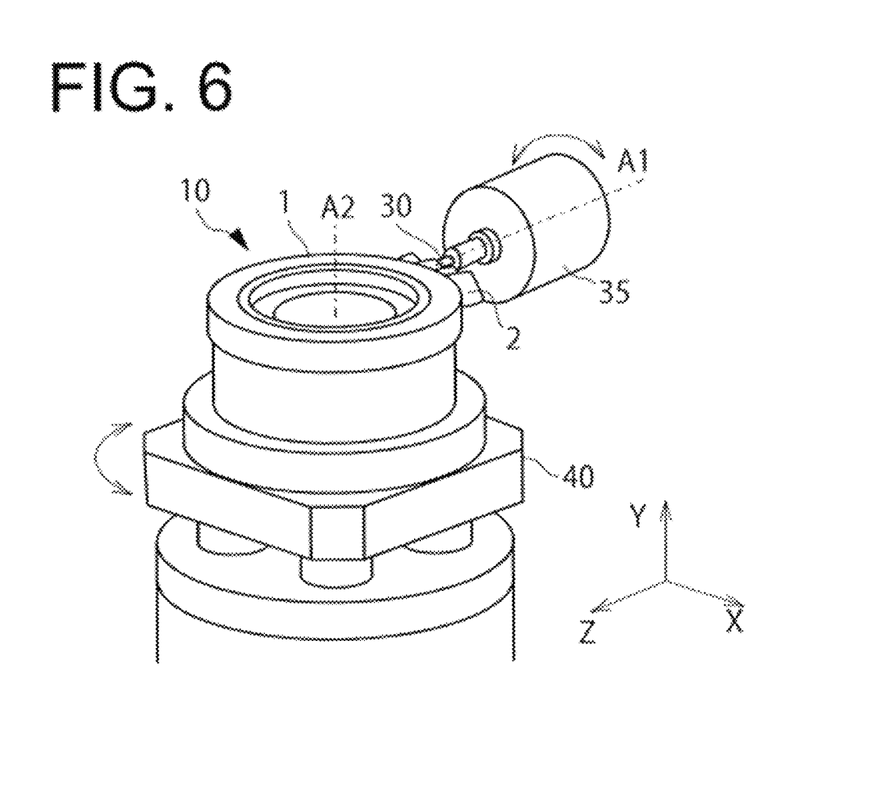
FIG. 6 is a perspective view of an example of machining equipment used in this embodiment.

Referring to FIG. 6, a possible example of machining equipment used to cut the integrally bladed rotor 10 is as follows. This machining equipment includes: a table 40, which fixes the center axis, A2, of the rotor disc 1 of the integrally bladed rotor 10 in the vertical direction; and a tool holder 35, which holds the turning tool 30 and is rotational about a rotation axis A1. By holding the turning tool 30, the tool holder 35 makes the cutting edge 32 of the turning tool 30 rotational about the rotation axis A1. The rotation axis A1 of the tool holder 35 is set in a horizontal direction, for example, and extends toward the inside of the rotor disc 1. In this respect, the table 40 and the tool holder 35 are movable relative to each other in a surface perpendicular to the rotation axis A1 in three linear axis directions, namely, the horizontal X axis direction, the vertical Y axis direction, and the Z axis direction, which is parallel to the rotation axis A1. Also, the table 40 is rotational about the center axis A2. That is, the above-described cutting is made possible by a combination of three linear axes and two rotational axes.

As described above, it is preferable that during the cutting, the direction of extension of the cutting edge 32 of the chip 31, which is fixed to the leading end portion of the turning tool 30, is parallel to a surface normal of the cutting point of the blade 2. The orientation of the cutting edge 32 is approximately perpendicular to the rotation axis A1 (see FIG. 3). For example, when it is necessary to make the orientation of the cutting edge 32 inclined in the X-Y plane, it is possible to rotate the tool holder 35 about the rotation axis A1. When it is necessary to make the orientation of the cutting edge 32 inclined in the X-Z plane, it is possible to combine a linear movement in the X axis direction and a rotation about the center axis A2 of the rotor disc 1. By combining the inclination in the X-Y plane and the inclination in the X-Z plane, the orientation of the cutting edge 32 can be made parallel to a surface normal of the cutting point. By combining the resulting combination with the above-described three-axis linear movements, the blade 2 can be cut while the cutting edge 32 is being circumferentially moved along the closed curve C and following the path R. That is, the integrally bladed rotor 10 is obtained by being cut such that the blade 2 is positioned in the closed curve C.

As far as an integrally bladed rotor is concerned, the blade 2 may in some cases be cut into such a shape that it is not necessary to make the orientation of the cutting edge 32 inclined in the X-Z plane. In this case, the above-described cutting is made possible by a combination of three linear axes and one rotational axis (rotation about the rotation axis A1 of the tool holder 35), without the need for the rotation of the table 40 about the center axis A2.

It is also possible to use such machining equipment that is capable of a combination of three linear axes and three rotational axes, which has an additional one rotational axis as compared with the above-described combination of three linear axes and two rotational axes. For example, it is possible to rotate the table 40 about a center axis parallel to the X axis. This increases the degree of freedom of cutting.

Figure 7A:
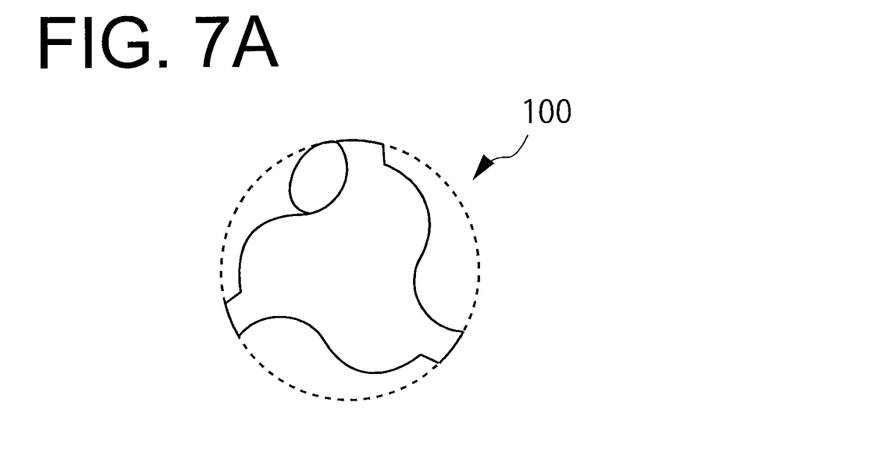
FIG. 7A is a front view of an end mill used in finishing of a conventional blade.
Figure 7B:
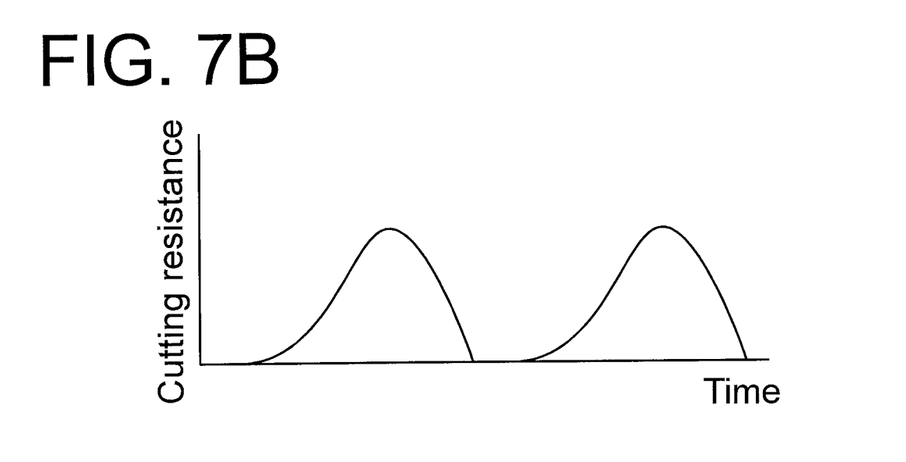
FIG. 7B is a graph showing change over time in resistance of cutting performed by the end mill.
Figure 7C:
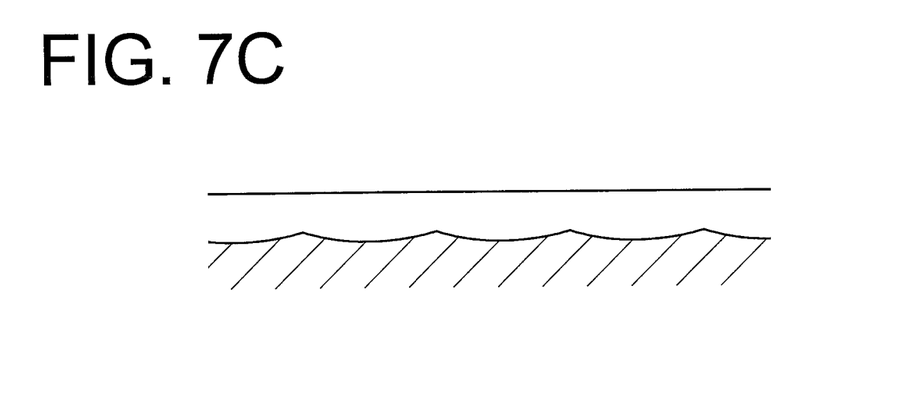
FIG. 7C is a cross-sectional view of a portion in the vicinity of a surface of the blade that has been subjected to rotational machining using the end mill.

Incidentally, conventional practice was to use a rotating tool such as an end mill 100 illustrated in FIG. 7A to perform finishing of a blade of an integrally bladed rotor. If such rotating tool is used, its cutting edge contacts the to-be-cut object intermittently, and thus the cutting resistance changes intermittently as illustrated in FIG. 7B. This makes chatter more likely to occur during machining. Also, the intermittent contacts might leave wavy cutting traces on the cutting surface of the to-be-cut object, as illustrated in FIG. 7C, which shows a cross-section of the to-be-cut object.

In contrast, the embodiment of the present invention is such that the closed curve C continues in a spiral shape when circumferentially moving around the blade 2. As a result of this interpolation, the path R is obtained for the cutting point to be moved on while the blade 2 is being cut. This configuration ensures that a uniform cutting load is obtained, making chatter less likely to occur. The above configuration also ensures that a smooth cutting surface is obtained, resulting in highly accurate machining of the blade 2. Also, even if the above-described cutting trace is left, it is possible to make the cutting trace oriented along the direction in which air flows. This makes the blade 2 superior in aerodynamic characteristics.

Next, a program for cutting the above-described blade 2 of the integrally bladed rotor 10 will be described by referring to FIG. 8.

Figure 8:
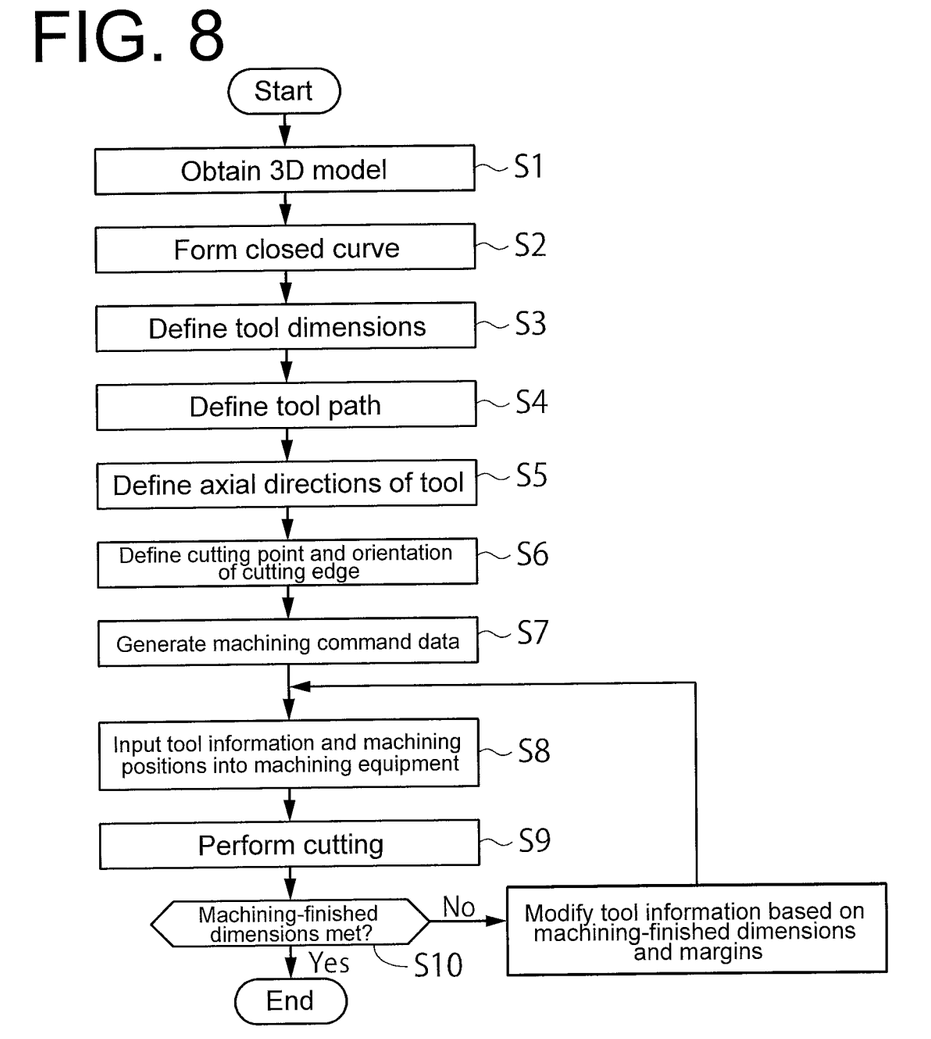
FIG. 8 is a flowchart of how to use one embodiment of a program for cutting the blade of the integrally bladed rotor.
Figure 9:
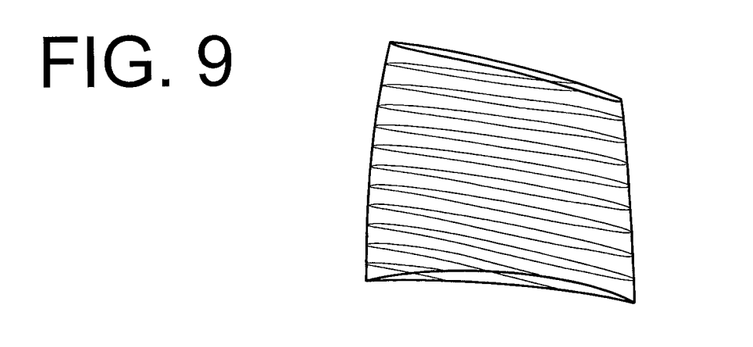
FIG. 9 is a perspective (see-through) view of an example three-dimensional model of the blade.

Referring to FIG. 8, first, a three-dimensional model of the blade 2 of the integrally bladed rotor 10 to be produced is obtained (S1). A mesh of a three-dimensional coordinate system is placed over this three-dimensional model so that the intersection between the mesh and the surface of the blade 2 is indicated by coordinate points (see FIG. 9). The coordinate points are input into a predetermined computer such as a PC, or may be input directly into the machining equipment to be used.

Then, a closed curve C, which surrounds the blade 2, is set on this three-dimensional model (S2). Specifically, first, a number of lattice points P are set on the ridge of the front edge 23, and the same number of lattice points P are set on the ridge of the rear edge 24. The number of the lattice points P, the positions of the lattice points P, and other parameters associated with the lattice points P are input by a worker. Then, the closed curve C is connected to the lattice points such that the closed curve C passes through: the same arrangement-order lattice points P on the ridges counted from the rotor disc 1; the positive-pressure surface 21; and the negative-pressure surface 22 (see FIG. 5A).

Next, tool dimensions are defined (S3). Tool dimensions include: the orientation of the cutting edge 32 and the position of the leading end portion of the cutting edge 32 in the turning tool 30; and the orientation and the position of the cutting edge 32 relative to the tool holder 35 and its rotation axis A1 with the turning tool 30 held by the tool holder 35. These tool dimensions are input by the worker.

Next, a tool path is defined (S4). In this example, the path R is determined as the tool path. The path R is made by making a feed movement from the leading end portion toward the base end portion of the blade 2 while making a circumferential movement around the blade 2 along the closed curve C. That is, the path R is made by making such an interpolation that the closed curve C continues in a spiral shape. Also, a surface normal of each cutting point on the path R is calculated and determined on the three-dimensional model.

Next, axial directions of the tool are defined (S5). In this example, the axial directions are determined by the worker from the axes described earlier, namely: three linear axes and one rotational axis; three linear axes and two rotational axes; and three linear axes and three rotational axes. For example, when it is not necessary to rotate the tool about the center axis A2 of the rotor disc 1, three linear axes and one rotational axis are determined as the movement axes of the machining equipment, and input by the worker.

Next, an orientation of the cutting edge 32 of the turning tool 30 at each cutting point on the above-described tool path (the path R) is defined (S6). Specifically, the angle of rotation about the rotation axis A1 of the tool holder 35, which holds the turning tool 30, and related parameters are determined such that the orientation of the cutting edge 32 is parallel to the surface normal determined at S4. It is possible to form a lead angle, as described earlier.

With these settings done, machining command data is generated along the tool path (S7). Specifically, at each cutting point, a combination of tool vectors indicating the position of the cutting edge 32 and the direction of the turning tool (for example, the orientation of the cutting edge 32) and a vector of the surface normal is prepared. Then, based on the combination, the movement direction of the turning tool 30 is determined.

Next, tool information and machining positions are input into the machining equipment (S8). In this example, a to-be-machined integrally bladed rotor 10, which is done with rough machining, is fixed. With the integrally bladed rotor 10 fixed, the turning tool 30 is held on the machining equipment. The worker inputs the initial position of the turning tool 30 into the machining equipment. The above-described machining command data generated in the computer is also input into the machining equipment.

Next, the machining equipment is caused to perform cutting based on the machining command data. Specifically, the machining equipment performs finishing of the blade 2 by cutting the blade 2 along the above-described path R.

Next, a dimension examination of the post-machined blade 2 is performed. Specifically, the blade 2 is checked on the machining equipment as to whether the blade 2 meets machining-finished dimensions (S10). More specifically, the blade 2 is checked as to whether the dimensions of the blade 2 are within predetermined margins of error as compared with the dimensions of the above-described three-dimensional model. The results are held as cutting information.

In this respect, when the blade 2 does not meet machining-finished dimensions (S10: No), the tool information is modified based on the machining-finished dimensions and the margins (necessary amounts of machining) The worker re-inputs the tool information (S8), and similar cutting is further performed (S9). That is, the machining command data is changed as well based on the tool information modified based on the above-described cutting information. When the blade 2 meets the machining-finished dimensions (S10: Yes), the finishing is ended.

Thus, the machining equipment is caused to perform cutting along the path R, which is formed by such an interpolation that the above-described closed curve C continues in a spiral shape. This ensures that a blade 2 superior in aerodynamic characteristics is machined highly accurately.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

While a representative embodiment and modifications according to the present invention have been described hereinabove, the present invention will not be limited to the embodiment and modifications; it is to be appreciated that various changes may be made by one of ordinary skill in the art. That is, various alternatives and modifications may be devised by one of ordinary skill in the art without departing from the scope of the present invention as defined in the appended claims.

What is claimed is:

1. A method for producing an integrally bladed rotor, comprising:
    providing a pre-machined bladed rotor comprising a rotor disc and blades which are integrally provided around the rotor disc and each of which has a positive-pressure surface and a negative-pressure surface opposite to the positive-pressure surface to have a ridge of a front edge and a ridge of a rear edge at which the positive-pressure surface and the negative-pressure surface merge;
    providing imaginary front lattice points on the ridge of the front edge and imaginary rear lattice points on the ridge of the rear edge;
    providing a first imaginary line on the positive-pressure surface and the negative-pressure surface to connect a first imaginary front lattice point among the imaginary front lattice points and a first imaginary rear lattice point among the imaginary rear lattice points;
    providing a second imaginary line on the positive-pressure surface and the negative-pressure surface to connect a second imaginary front lattice point next to the first imaginary front lattice point among the imaginary front lattice points and a second imaginary rear lattice point next to the first imaginary rear lattice point among the imaginary rear lattice points;
    providing a spiral path on the positive-pressure surface and the negative-pressure surface by connecting the first imaginary line and the second imaginary line with a spiral curve; and
    cutting the positive-pressure surface and the negative-pressure surface of each of the blades by moving a cutting point corresponding to a cutting edge of a turning tool on the positive-pressure surface and the negative-pressure surface along the spiral path.

2. The method according to claim 1, wherein the spiral path is differentiable.

3. The method according to claim 2, wherein an orientation of the cutting edge is controlled to be parallel to a surface normal at the cutting point.

4. The method according to claim 1, wherein the imaginary front lattice points and the imaginary rear lattice points are provided such that the first imaginary line and the second imaginary line extend along an air flow on the positive-pressure surface and the negative-pressure surface when the integrally bladed rotor rotates.

5. The method according to claim 4, wherein the imaginary front lattice points are provided with equal intervals and the imaginary rear lattice points are provided with equal intervals.

6. The method according to claim 1, further comprising:
    changing the spiral path based on cutting information for the turning tool.

7. An integrally bladed rotor produced by the method according to claim 1.

8. The integrally bladed rotor according to claim 7, wherein each of the front edge and the rear edge of each of the blades has a continuous curved surface continuous from the positive-pressure surface and the negative-pressure surface.

9. The integrally bladed rotor according to claim 8, wherein each of the blades is cut along a flow of air flowing on the blades when the integrally bladed rotor rotates.

10. The method according to claim 1, wherein each of the blades are cut from a tip end of each of the blades along a radial direction of the rotor disc toward the rotor disc opposite to the tip end along the radial direction.

11. The method according to claim 1, wherein the first imaginary front lattice point and the first imaginary rear lattice point are provided closest to a tip end of each of the blades, the tip end being provided opposite to the rotor disc along a radial direction of the rotor disc.

12. The method according to claim 1, wherein additional imaginary lines in addition to the first imaginary line and the second first imaginary line are provided, and the spiral path is provided on the positive-pressure surface and the negative-pressure surface by connecting the additional imaginary lines.

13. A non-transitory computer readable storage medium retrievably storing a computer-executable program therein, the computer-executable program causing a computer to perform a method for producing an integrally bladed rotor from a pre-machined bladed rotor including a rotor disc and blades which are integrally provided around the rotor disc and each of which has a positive-pressure surface and a negative-pressure surface opposite to the positive-pressure surface to have a ridge of a front edge and a ridge of a rear edge at which the positive-pressure surface and the negative-pressure surface merge, the method comprising:
    providing imaginary front lattice points on the ridge of the front edge and imaginary rear lattice points on the ridge of the rear edge;
    providing a first imaginary line on the positive-pressure surface and the negative-pressure surface to connect a first imaginary front lattice point among the imaginary front lattice points and a first imaginary rear lattice point among the imaginary rear lattice points;
    providing a second imaginary line on the positive-pressure surface and the negative-pressure surface to connect a second imaginary front lattice point next to the first imaginary front lattice point among the imaginary front lattice points and a second imaginary rear lattice point next to the first imaginary rear lattice point among the imaginary rear lattice points;
    generating machining command including a spiral path on the positive-pressure surface and the negative-pressure surface by connecting the first imaginary line and the second imaginary line with a spiral curve; and
    cutting the positive-pressure surface and the negative-pressure surface of each of the blades by moving a cutting point corresponding to a cutting edge of a turning tool on the positive-pressure surface and the negative-pressure surface according to the machining command.

14. The non-transitory computer readable storage medium according to claim 13, wherein the spiral path is differentiable.

15. The non-transitory computer readable storage medium according to claim 13, wherein the imaginary front lattice points and the imaginary rear lattice points are provided such that the first imaginary line and the second imaginary line extend along an air flow on the positive-pressure surface and the negative-pressure surface when the integrally bladed rotor rotates.

16. The non-transitory computer readable storage medium according to claim 15, wherein the imaginary front lattice points are provided with equal intervals and the imaginary rear lattice points are provided with equal intervals.

17. The non-transitory computer readable storage medium according to claim 13, wherein the machining command comprises at least two of the cutting point, a position of the cutting edge, a tool vector indicating a direction of the turning tool, and a plane normal vector indicating a direction of a surface normal.

18. The non-transitory computer readable storage medium according to claim 17, further comprising:
changing the spiral path based on cutting information for the turning tool.

* * * * *